United States Patent
Achilles et al.

(10) Patent No.: US 7,585,022 B2
(45) Date of Patent: Sep. 8, 2009

(54) VEHICLE SEAT SYSTEM, ESPECIALLY FOR AIRCRAFT

(75) Inventors: Sven Achilles, Trophy Club, TX (US); Hartmut Schurg, Schwäbisch Hall (DE)

(73) Assignee: Recaro Aircraft Seating GmbH & Co. KG, Schwäbisch Hall (DE)

( * ) Notice: Subject to any disclaimer, the term of this patent is extended or adjusted under 35 U.S.C. 154(b) by 473 days.

(21) Appl. No.: 11/100,618

(22) Filed: Apr. 7, 2005

(65) Prior Publication Data

US 2006/0001302 A1 Jan. 5, 2006

(30) Foreign Application Priority Data

Jul. 4, 2004 (DE) .................. 10 2004 017 078

(51) Int. Cl.
*A47C 7/62* (2006.01)
(52) U.S. Cl. .................. 297/188.16; 297/217.1; 297/117; 297/113; 297/188.18; 297/217.6
(58) Field of Classification Search .................. 297/113, 297/115, 117, 112, 217.3–217.6, 411.25, 297/411.3, 411.32, 411.46, 184.1, 184.11, 297/188.14, 188.21, 188.16, 188.18, 217.1; 244/118.5, 118.6, 122 R
See application file for complete search history.

(56) References Cited

U.S. PATENT DOCUMENTS

| | | | | |
|---|---|---|---|---|
| 2,744,997 | A | * | 5/1956 | Sefsik et al. ............. 297/217.3 |
| 2,751,504 | A | * | 6/1956 | Verhoeff et al. ............. 378/189 |
| 3,628,829 | A | * | 12/1971 | Heilig ..................... 297/217.4 |
| 3,961,807 | A | * | 6/1976 | Maki et al. ................... 280/807 |
| 4,533,175 | A | * | 8/1985 | Brennan ..................... 297/232 |
| 5,000,511 | A | * | 3/1991 | Shichijo et al. ........ 297/188.05 |
| 5,316,369 | A | * | 5/1994 | Kanda ................... 297/188.15 |
| 5,374,104 | A | * | 12/1994 | Moore et al. ........... 297/188.16 |
| 5,503,457 | A | * | 4/1996 | Rosado .................... 297/448.1 |
| 5,564,784 | A | * | 10/1996 | Felling ................. 297/344.23 |
| 5,667,179 | A | * | 9/1997 | Rosen ..................... 248/278.1 |
| 5,709,360 | A | | 1/1998 | Rosen |
| 5,775,771 | A | * | 7/1998 | La Cour et al. ............. 297/238 |

(Continued)

FOREIGN PATENT DOCUMENTS

DE 195 41 567 C1 1/1997
EP 0 368 609 A2 5/1990

*Primary Examiner*—David Dunn
*Assistant Examiner*—Erika Garrett
(74) *Attorney, Agent, or Firm*—Roylance, Abrams, Berdo & Goodman, L.L.P.

(57) ABSTRACT

A vehicle seat system, especially for aircraft, has seat components such as a backrest (5) and a seat part (3) bordered at least on one side by a console (9) forming the arm rest. An arm-like operating part (13) extends at least partially above the plane of the head of the seat occupant (45), and has operating elements which are used at least in part to enhance comfort and/or suitable within the context of operation, especially flight operation, for this purpose. Because the arm-like operating part (13) forms a widening of the console (9) and extends forward proceeding from the area of the backrest (5) above the console (9) in an extension, and because the arm-like operating part (13) is configured as a rigid arched support, an aesthetically pleasing solution is obtained requiring little installation space, saving weight and providing a multi-function solution.

13 Claims, 6 Drawing Sheets

U.S. PATENT DOCUMENTS

| | | | | |
|---|---|---|---|---|
| 5,791,761 A | * | 8/1998 | Bryant et al. | 362/131 |
| 6,158,805 A | * | 12/2000 | Blaney | 297/184.11 |
| 6,530,842 B1 | * | 3/2003 | Wells et al. | 463/46 |
| 6,758,521 B2 | * | 7/2004 | Imamura et al. | 297/217.3 |
| 6,916,065 B2 | * | 7/2005 | Park | 297/217.1 |
| 2003/0064623 A1 | | 4/2003 | Rowland et al. | |

* cited by examiner

VEHICLE SEAT SYSTEM, ESPECIALLY FOR AIRCRAFT

FIELD OF THE INVENTION

The present invention relates to a vehicle seat system, especially for aircraft, with seat components such as a backrest and a seat part bordered at least on one side by a console. The console forms the arm rest. An arm-like operating part extends and projects at least partially above the plane of the head of the seat occupant. Operating elements on the console are used at least in part to enhance comfort and/or are suitable for this purpose within the context of operation, especially flight operation.

BACKGROUND OF THE INVENTION

Conventionally, in vehicles intended for conveyance of passengers, especially aircraft of commercial airlines, it is of special importance that the seat systems are designed using the available cabin space in the best possible manner, with a maximum of functionality and comfort for the seat occupant. To meet these requirements, currently conventional systems have a plurality of integrated, attached auxiliary devices or those mounted on the adjacent seat system, specifically on the back of the seat system which follows next in the direction of travel or against the direction of travel. DE 195 41 567 C1, for example, discloses an aircraft passenger seat which, oriented laterally especially to an adjacent seat, is bordered by a console forming an arm rest. A partition can be pulled out from the console in the manner of a fan and can be fastened in the position of use, creating for the seat occupant a personal space relative to the adjacent areas.

Furthermore, U.S. Pat. No. 5,709,360 discloses equipping the center arm console of an aircraft passenger seat with a monitor instead of a partition. The monitor can be swiveled out of its storage position in the center console into the position of use by a support arm. The swiveling support arm can be fastened in definable catch positions. In addition to the first swivel direction of its free end, the support arm enables another, second swiveling direction for the monitor. A comparable monitor swiveling unit is disclosed in EP 0 368 609 A2, where a monitor connected to the free end of the support arm can be swiveled out of the position of non-use located in the distance between two backrests of aircraft passenger seats. The backrests are arranged next to one another in a row. The monitor can be swiveled forward into a position of use permitting two seat occupants sitting next to one another to look at the monitor.

In the seat systems described, a complex design is necessary to house the partition and the monitor swiveling mechanism appropriately. This complexity adversely affects optimum use of the available cabin space.

Accordingly, U.S. Patent Publication No. 2003/0064623 A1 discloses an aircraft passenger seat providing an arm-like operating part in a swan neck design in the area near the head of the seat occupant and located above or laterally on the backrest. The arm has an operating part on its free end, in the form of a lighting mechanism or in the form of a connection possibility for a computer unit, especially a personal computer. The solution is advantageous in that the respective seat occupant is able to manually bend the swan neck into shapes such that the operating part in terms of its position satisfies the occupant's ergonomic requirements. However, a multifunction solution cannot be obtained in this way. Depending on the position of the swan neck, the solution may be perceived by the seat neighbor as disturbing. This design, in the area of the top of the backrest, also requires a large amount of installation space and in a practical embodiment is hardly pleasing from an aesthetic point of view.

SUMMARY OF THE INVENTION

Object of the present invention are to provide a vehicle seat system permitting improved use of space without loss of functionality and/or the comfort afforded the seat occupant. An additional object is to increase the possible applications in the sense of a multifunction solution.

In a vehicle seat system, these objects are achieved according to the present invention by an arm-like operating part forming a widening of the console and extending forward, proceeding from the area of the backrest above the console in an extension thereof. The arm-like operating part is configured as a rigid arched support. The arm-like operating part thus extends forward in seats in which the seat part is bordered laterally by a console forming an arm rest, preferably in the form of a widening of the console proceeding from the area of the backrest above the arm rest. This solution is not only aesthetically pleasing, but is also understood by the seat occupants to be a seat component and perceived as less disturbing, in contrast to the known designs with their attached components having an additional function.

In the present invention, the operating elements can be present in a comparatively large number compared to conventional seat systems, and are moved into a rigid, arch-like component which is located overhead. A simpler and more compact design arises for the remaining seat components. This structure contributes to better use of space without adversely affecting functionality or comfort. An extremely large number of operating and control elements can then be housed in the rigid arched support. The arm-like operating part, as operating elements used to increase comfort, can have, for example, a beverage container or bottle holder, and/or a handle to aid seniors or handicapped seat occupants in standing up, and/or at least one storage compartment for travel accessories, and/or a holder for positionally adjustable mounting of a monitor.

The positionally adjustable mounting of a television monitor on an operating part of the respective associated seat located overhead compared to the conventional mounting of the monitor on the back of the seat located in front has the advantage that the adjustability of the monitor offers a good view in any seat position. Also, a particularly advantageous manner, the wiring between the seat and the seat which is in the next row forward is eliminated.

Other operating elements which can be integrated into the arm-like operating element to enhance comfort can include a reading light, fresh air nozzles, or those operating elements used to improve the sense of well-being of the seat occupant by creating a private sphere. They include, for example, partitions which as a so-called "privacy divider" form a shield relative to the adjacent seat. A partition can be in the form of a retractable shade which is connected to the arm-like operating part.

Operating, specifically flight operating elements, on the arm-like operating part can be controls designed for adjustments, especially seat adjustments, and/or a holder for an oxygen mask and/or a connection for a multifunction control device which can be operated at a distance from the arm-like operating part, and/or a suspension device for a headset, and/or a marker for seat numbering and the like.

Indicator lights, for example, to call the flight attendant, PC power supply and the like are also possible.

If the console is a center console forming the arm rest between two seats located next to one another, the arm-like operating part extends above the center console. If it is a double-seat seating system, the arm-like operating part can be assigned to the two seats located next to one another as an operating element.

The arm-like operating part is configured in the form of an arched support, for example, in a curved shape, approximately in the manner of the segment of an arc. It can be a rigid arched support or an arched support of variable shape composed of rigid arched support sections, for example, configured in the manner of a telescope to be shortened or extended. In any case, in the configuration of a flexurally and torsionally stiff arrangement, the rigid arched support is configured as a support rail and is preferably rectangular in cross section. For especially favorable weight engineering, generally rectangular cross section can end in a square cross section toward the free end. In this way, especially increased strength in the area of the base part is ensured. In the head area of the respective seat occupant, the support arm tapers so that a large amount of space is available there, for example, for providing a monitor unit.

Depending on circumstances or requirements, the arched support can be mounted to be stationary or to be lowerable. The latter arrangement is preferred when it is a rigid, one-piece arched support. In these embodiments, the arched support can be folded into the pertinent console for lowering. Alternatively, the arched support, when it is coupled to the pertinent console in the area of the backrest of the pertinent seat, can be supported to be lowerable such that it can be retracted into the structure of the backrest by a combined swiveling and displacement motion.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
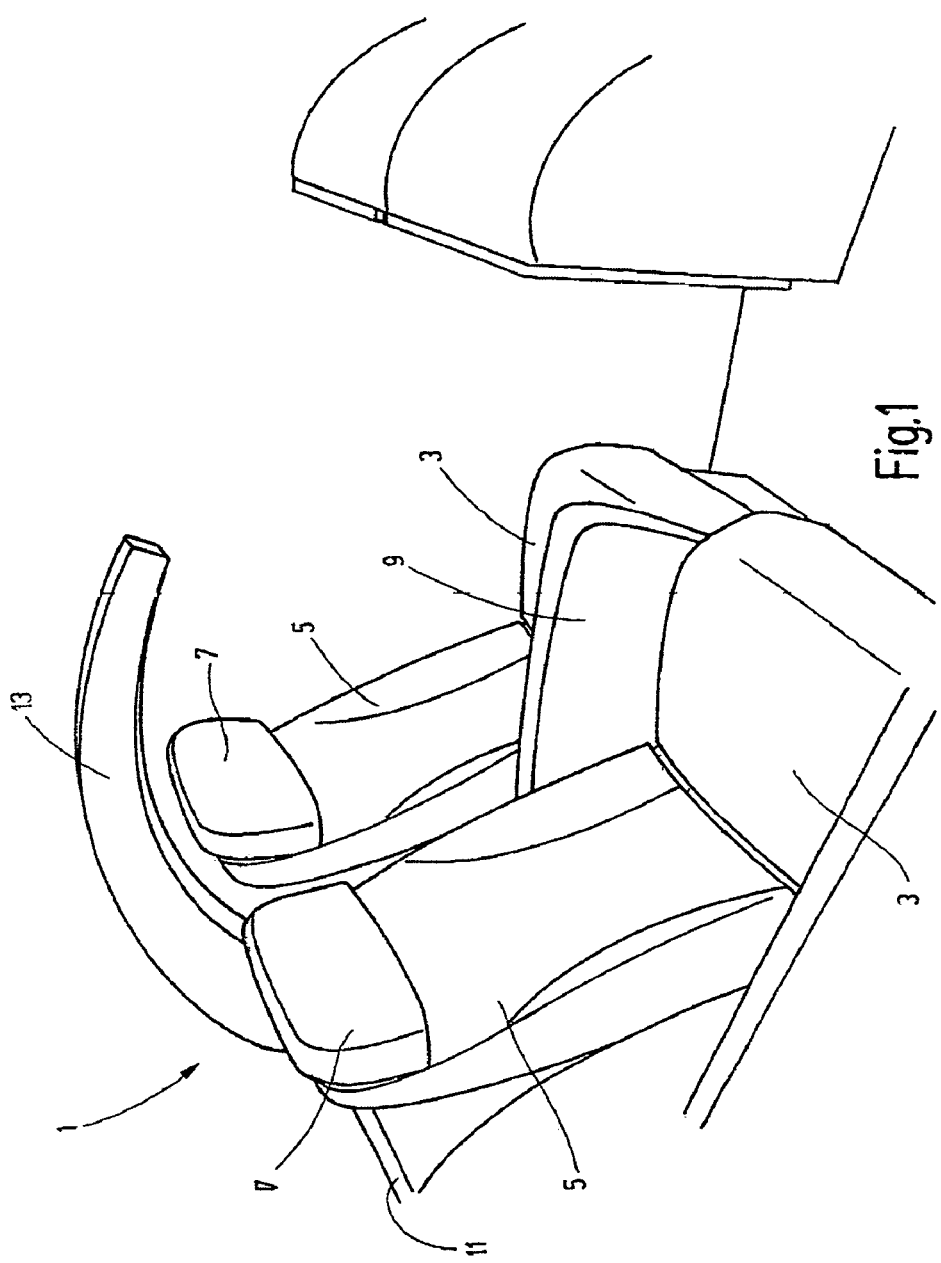
FIG. 1 is a schematic, greatly simplified perspective of a seat system according to a first embodiment of the present invention in the form of an aircraft passenger double seat.

FIG. 1 shows an exemplary embodiment of the seat system according to the present invention in the form of an aircraft passenger double seat. Of the seat components of the double seat 1, only seat parts 3, backrests 5 with head cushions or rests 7, center console 9 located as an arm rest between the seat parts, and a carrier structure 11 are shown schematically. Moreover, the seat system of the present invention has an arm-like operating part extending in the form of a curved arched support 13 over a large part of its length above the plane of the head cushion 7. Proceeding from its back end 15 seen in FIGS. 2 and 3 and connected to the carrier structure 11, the arched support 13 extends curved in an arc shape projecting away from the end 15 forward in the direction of flight. It extends in the main plane of and above the center console 9. In the embodiment of FIG. 1, as in the other exemplary embodiments shown, support 13 forms a widening of the center console 9 located overhead.

Figure 3:
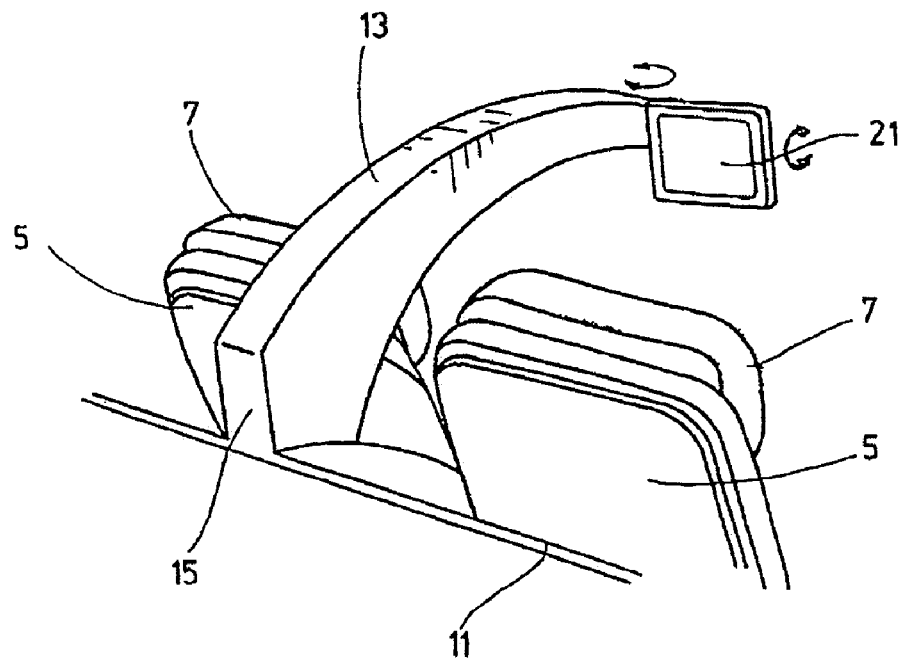
FIGS. 2 and 3, compared to FIG. 1, are smaller scale schematic, greatly simplified, perspective, partial views of seat systems according to second and third embodiments of the present invention, respectively, looking at the back of the backrest.
Figure 2:
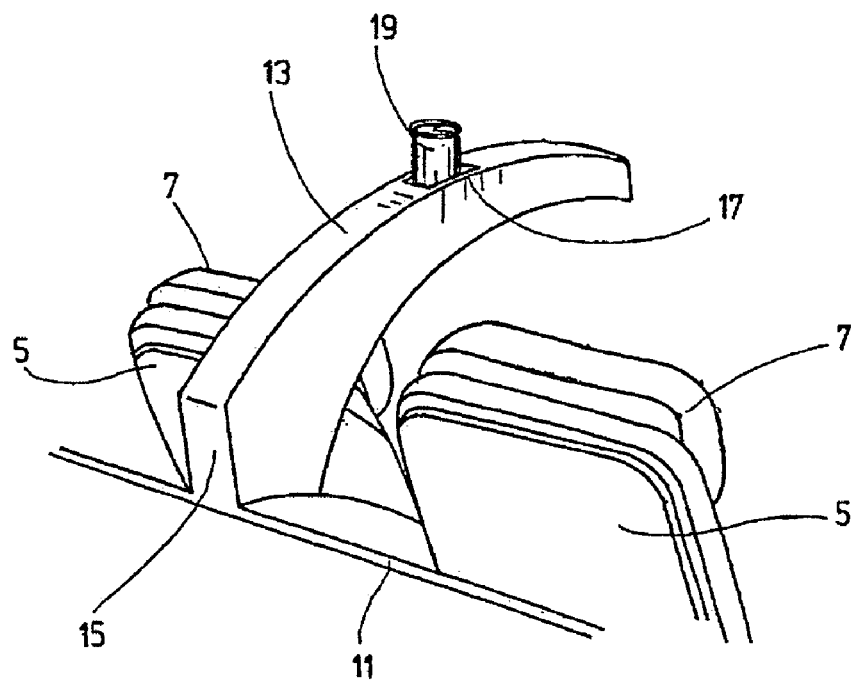

In the embodiments of FIGS. 2 and 3, the arched support 13 with its back end 15 is connected to the carrier structure 11 of the seat system. This connection can be configured in different ways, for example, in the form of a fixed connection. In an optional configuration the arched support can also be detachable. This detachability is used to increase the modularity of the overall system. Alternatively, a lockable swiveling motion can be allowed enabling the arched support to be folded down. As will be described in detail below with reference to the embodiment from FIG. 7, the arched support 13 with its end 15 can also be supported on a sliding guide. Such support enables limiting swiveling motion and is located on the center console 9 or the carrier structure 11, so that the arched support 13 can be retracted into the center console 9 or the carrier structure 11 and lowered into it by a combined swiveling and sliding motion. It is especially advantageous to support the arched support 13 with a capacity to be lowered or folded down when the arched support 13 is rigid. A fixed connection of the end 15 of the arched support 13 with the assigned structural element is however advantageous when the arched support 13 does not form a fixed component, but has a variable shape, for example, by the arched support's 13 being configured such that it can be shortened by telescoping and can be extended into the position of use shown in the figures.

FIG. 2 shows an exemplary embodiment in which the arched support 13 on its top has a holding device 17 for a beverage container 19 or a bottle.

FIG. 3 shows one example of the support of a flat screen monitor 21 on the front end area of the arched support 13. The suspension is made such that adjustment of the position of the monitor 21 around two axes perpendicular to one another is made possible providing the seat occupant with a good view of the monitor 21 for all possible seat settings.

Figure 4:
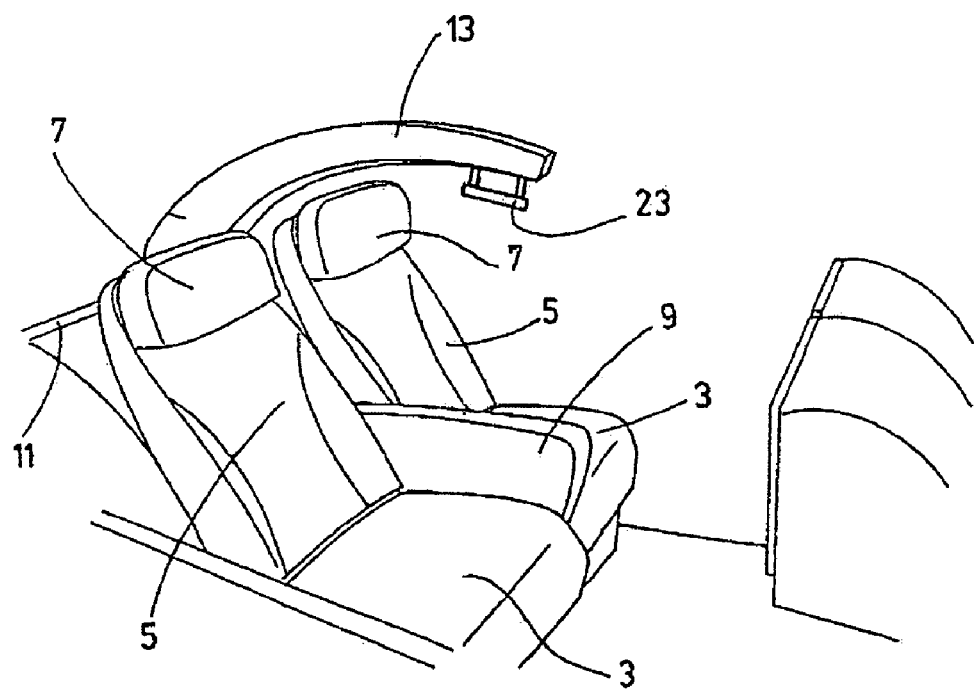
FIGS. 4 and 5 are partial schematic, perspective views of seat systems of fourth and fifth embodiments of the present invention, respectively, looking at the front of the seat.

FIG. 4 shows an example in which, on the front end area of the arched support 13, a handle 23 is attached to aid seniors and handicapped seat occupants in standing up.

Figure 5:
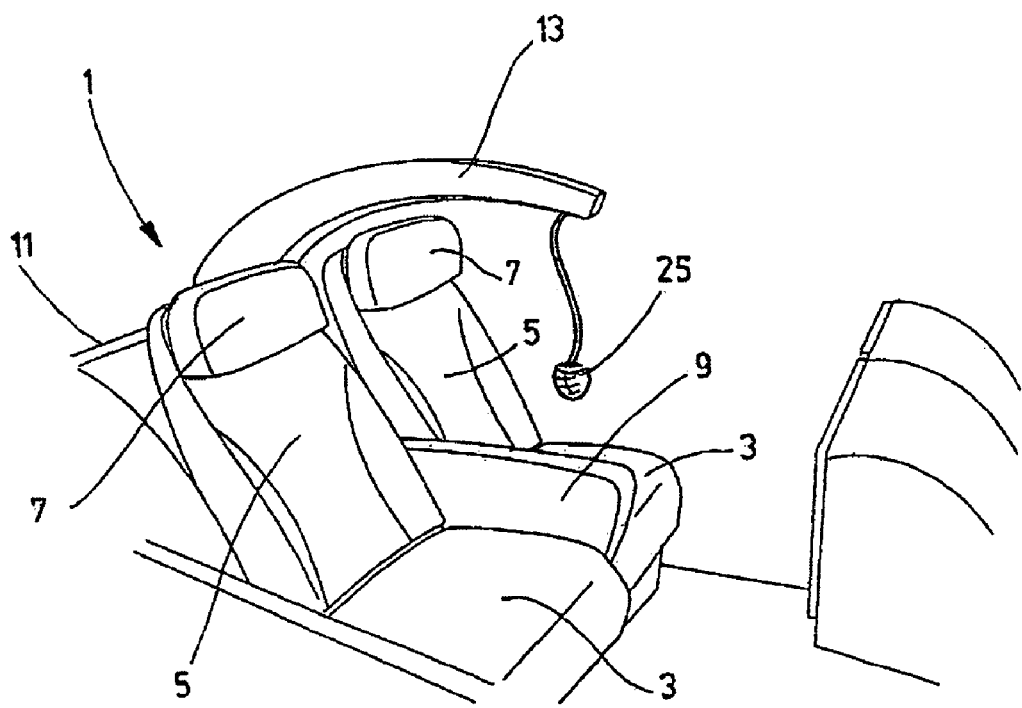

FIG. 5 shows one example in which the arched support 13, in its front section, has a compartment for housing of oxygen masks, of which there is one for each seat of the double seat system 1. In FIG. 5 only one oxygen mask 25 is shown which has been released from the compartment and has dropped down.

Figure 6:
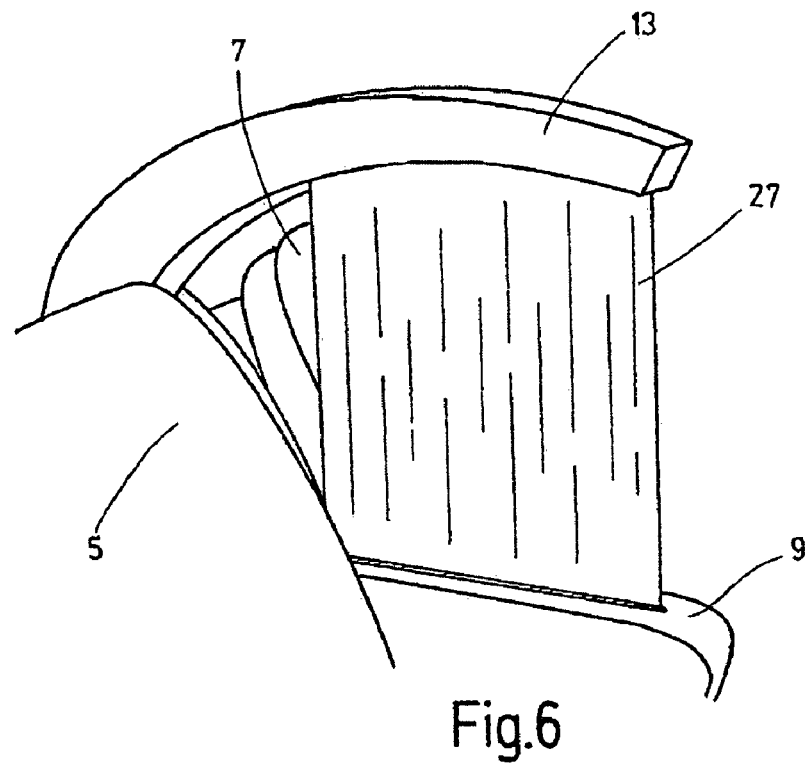
FIG. 6 is a partial perspective view of a seat system according to a sixth embodiment of the present invention greatly simplified and on a larger scale compared to the preceding figures.

FIG. 6 shows a version in which the arched support 13 extending above the center console 9 is provided with a shade 27. The shade can be pulled out of the arched support 13 and drawn down as far as the center console 9. In the position drawn down toward the center console 9 and shown in FIG. 6, the shade 27 forms a partition between the seats located next to one another, and thus, contributes to enhancing comfort by creating a private sphere for the pertinent seat occupant.

Figure 7:
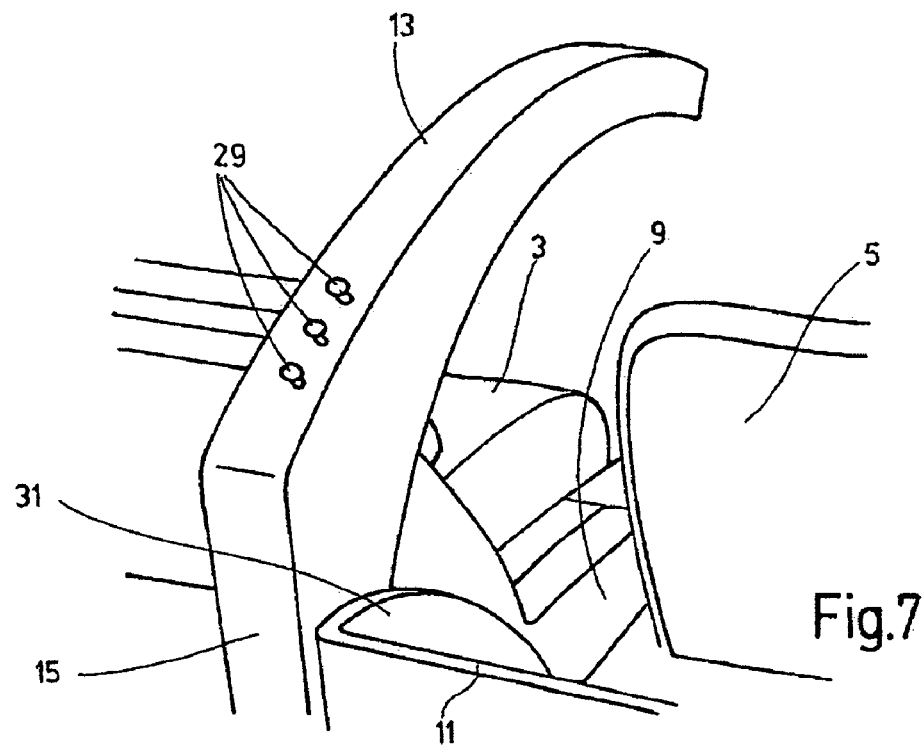
FIG. 7 is a partial perspective view, drawn schematically and greatly simplified on approximately the same scale as FIG. 6, of a seat system according to a seventh embodiment of the present invention, with the backrest upholstery partially removed from the backrest structure.

FIG. 7 shows a solution in which the arched support 13, on its top, has controls which can be manually actuated in the form of push-buttons 29. These controls are conventionally integrated in the consoles forming the lateral boundary of the seat part in known seat systems. The displacement of these elements into the arched support 13, as well as the displacement of other relevant operating elements into the arched support 13, makes it advantageously possible to be able to configure the pertinent console, specifically the center console 9 between the bordering seats, correspondingly narrower. This narrowing provides a more compact design of the seat system without loss of functionality. This more compact design is of very great economic importance due to better use of existing cabin space.

FIG. 7 moreover shows a configuration of the back end 15 of the arched support 13 on an adjoining edge element 31 of the carrier structure 11. As already indicated above, the connection between the end 15 of the arched support 13 and the carrier structure 11 can be a combined swiveling and sliding guide installed between the wall part 31 and the corresponding wall part which is opposite the latter and which is not shown in FIG. 7, that is, the corresponding wall part of the carrier structure of the bordering seat. Such guide enables lowering of the arched support 13 by a combined swiveling and retraction motion to the rear.

Figure 8:
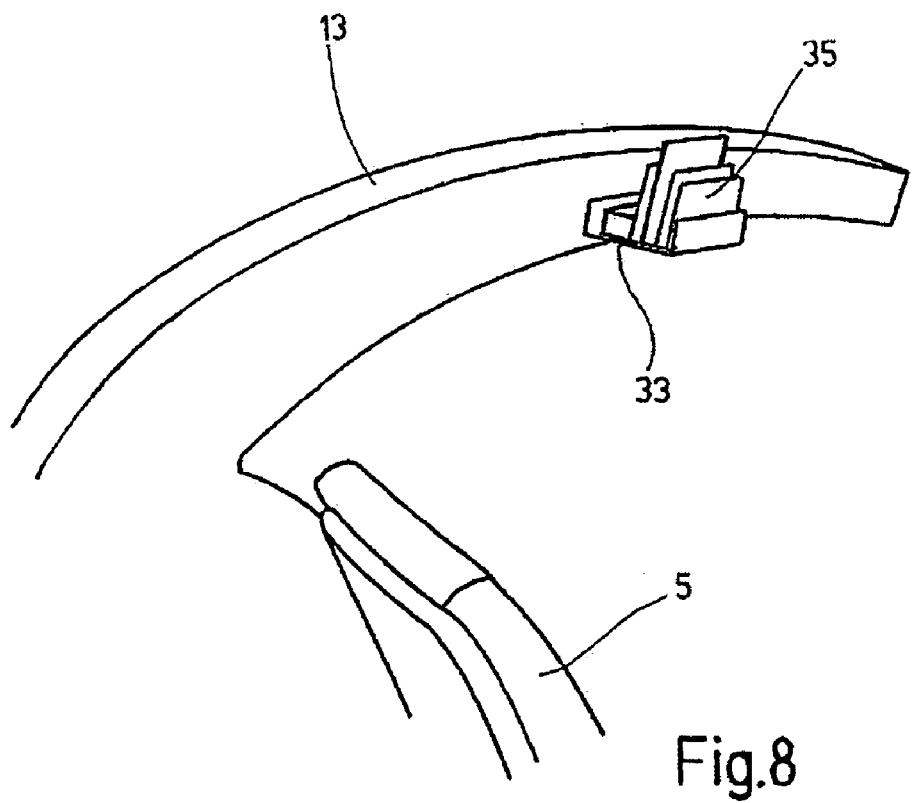
FIG. 8 is a partial schematic, perspective view, drawn approximately on the scale of FIG. 7, of the arm-like operating part according to an eighth embodiment of the present invention.

FIG. 8 shows another embodiment in which the arched support 13 has a slide-out compartment 33 for travel accessories 35.

Figure 9:
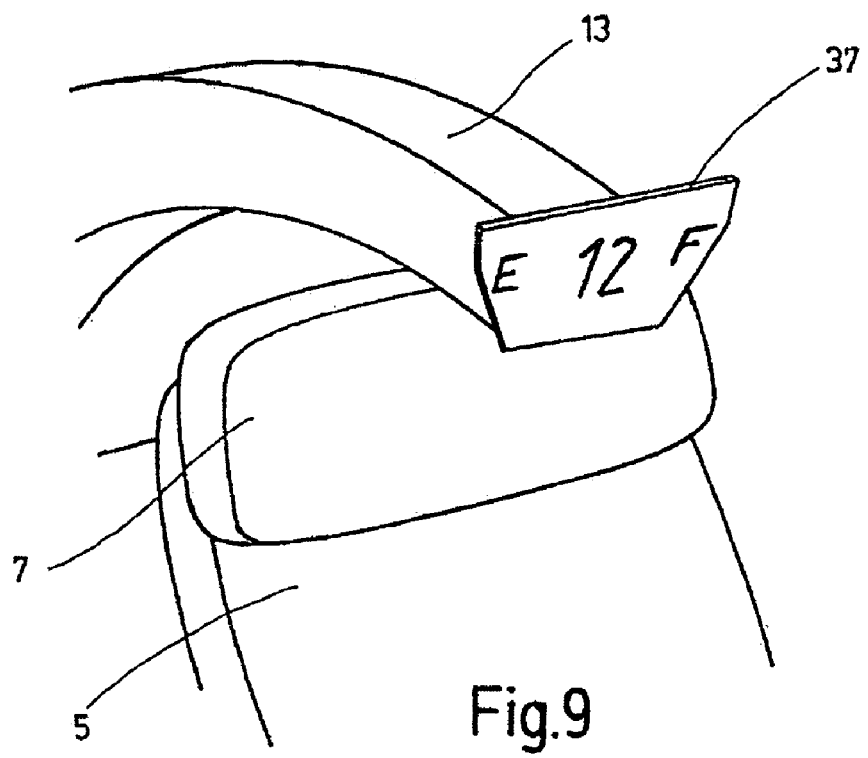
FIG. 9 is a partial, highly schematic, perspective view, on a larger scale than FIG. 8, of a seat system according to a ninth embodiment of the present invention, with only the area adjacent to the end area of the arm-like operating part being shown.

FIG. 9 shows one embodiment in which the arched support 13 does not extend in the plane of the console which laterally borders the seat, but extends centrally above the pertinent seat. As shown, on the front end of the arched support 13, a marker 37 shows the seat number.

Figure 10:
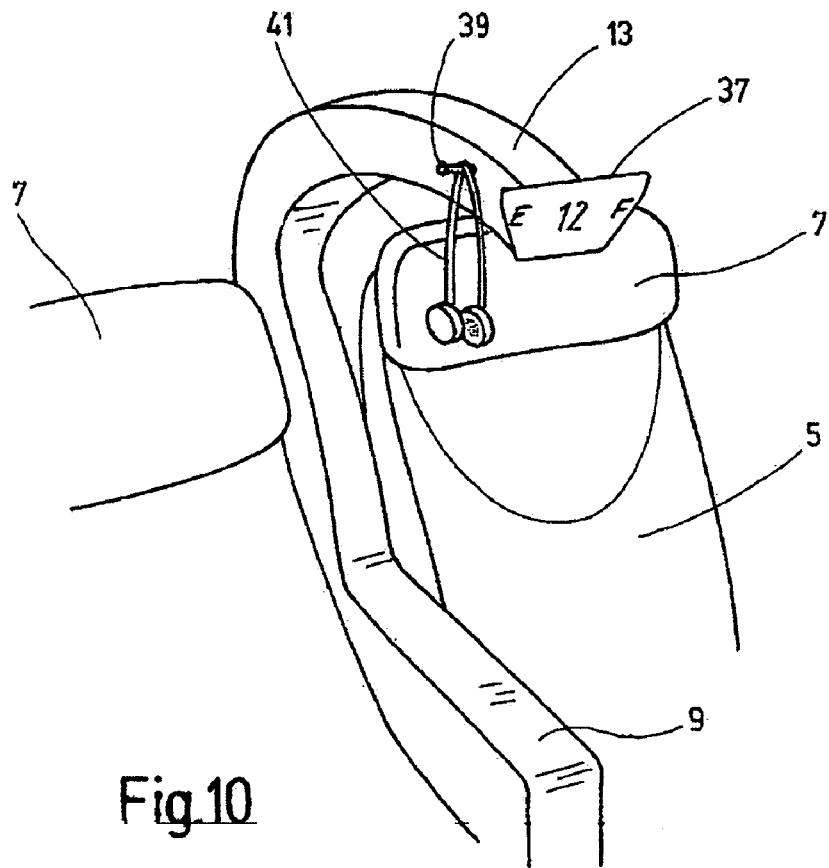
FIG. 10 is a partial schematic, greatly simplified, perspective view of a seat system, on a smaller scale than FIG. 9, according to a tenth embodiment of the present invention, looking at the front of the seat.

In the embodiment shown in FIG. 10, the front end of the arched support 13 is likewise provided with a marker 37. The arched support 13 is securely connected to the center console 9 on its back end so that the arched support 13, forms a widening of the console 9, and extends up from the back end of the console 9. The arched support 13, as another operating element, has hooks 39 for hanging up headsets 41. Only one hook with the headset 41 located on it is shown.

Figure 11:
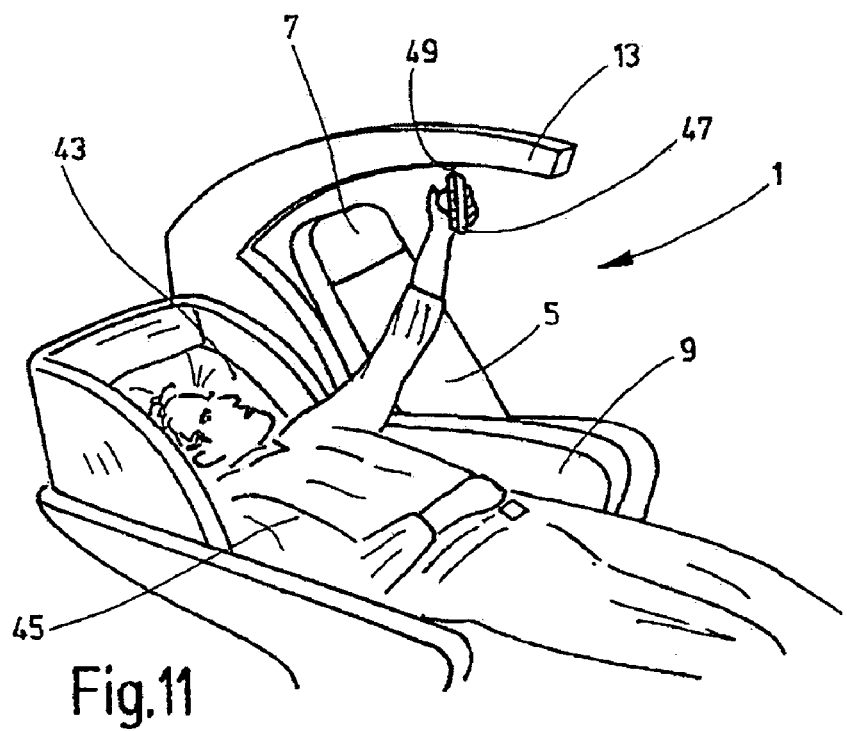
FIG. 11 is a partial schematic, greatly simplified, perspective view of a seating system, on a smaller scale than FIG. 10, according to an eleventh embodiment of the present invention, looking at the front of the seat.

FIG. 11 finally shows one example in which the arched support 13 in the same manner as in FIG. 10 forms a fixed widening of the center console 9. One of the two seats of the double seat 1 is moved into the horizontal position as a reclining seat 43. To enable the seat occupant 45, even when he has assumed the reclining position, to easily reach and control the controls provided for the seat system, the arched support 13 as an operating element has a multifunction control device 47. Device 47 is coupled to the arched support 13 by a pull-out cable connection 49. Thus, it can be actuated at a distance from the arched support 13 and enables the seat occupant 45 to comfortably execute pertinent control and operating commands, even in the reclined position.

The rigid arched support 13 as an arm-like operating part is configured as a rail or support rail and extends rectangularly in cross section. The generally rectangular cross section towards the free end extends out into a square cross section. On its base part, the arched support 13 is rigidly anchored. Towards its free end, a tapering cross section still has the necessary stability to resist movement. In particular, this configuration is insensitive to vibrations. The arched support 13 is preferably made as a hollow section. In addition to a top side and a bottom side, it has two transverse sides which extend laterally at a distance. Both the top side and the bottom side are made in the shape of an arc. The bottom side has a greater, especially concave curvature compared to the top side. The curvature of the top side is less pronounced, and is made convex. The laterally configured transverse sides are made two-dimensional and extend parallel to one another spaced apart by the top and bottom sides. In an embodiment which is not shown, the bottom side can be widened in the manner of forming a trapezoid to increase torsional stiffness.

As already mentioned, since all the operating elements for the seat system can be combined on the overhead arched support, advantageously it is not necessary to provide cable connections to the adjacent front seat, as is ordinarily necessary when electrical devices such as a monitor, telephone, and the like are mounted on the back of the front seat. On the arched support 13, the operating elements in the illustrated examples and any combinations thereof with a plurality of elements can be mounted on the arched support or located within the arched support.

While various embodiments have been chosen to illustrate the invention, it will be understood by those skilled in the art that various changes and modifications can be made therein without departing from the scope of the invention as defined in the appended claims.

What is claimed is:

1. A vehicle seat system, comprising:
a backrest with a head rest;
a seat part coupled to the backrest;
a console bordering on one side of the seat part and forming an arm rest;
an operating arm forming a widening of said console and extending forwardly from an area adjacent said backrest, above said console and at least partially above said head rest, said operating arm being a rigid arched support fixed to said console; and
operating elements on said operating arm for operating seat features during vehicle travel.

2. A vehicle seat system according to claim 1 wherein the vehicle seat system is an aircraft seat.

3. A vehicle seat system according to claim 1 wherein said operating elements comprise at least one of a beverage container holder, a handle aiding seat occupants in standing up, a storage compartment for travel accessories, and a position-adjustable mounting for a monitor.

4. A vehicle seat system according to claim 1 wherein said operating elements comprise a space separator.

5. A vehicle seat system according to claim 4 wherein said separator comprises a retractable shade connected to said operating arm.

6. A vehicle seat system according to claim 1 wherein said operating elements comprise at least one of seat adjustment controls, an oxygen mask holder, a multifunction control device connection operable at a distance from said operating arm, a head set suspension, and a seat number marker.

7. A vehicle seat system according to claim 1 wherein said operating arm is rectangular in transverse cross section.

8. A vehicle seat system according to claim 7 wherein said operating arm ends in a free end which is square in transverse cross section.

9. A vehicle seat system according to claim 1 wherein said console is a center console and forms an arm rest between adjacent seats.

10. A vehicle seat system according to claim 1 wherein said arched support has a variable shape.

11. A vehicle seat system according to claim 10 wherein said arched support is permanently attached to a seat support.

12. A vehicle seat system according to claim 10 wherein said arched support is detachably coupled to a seat support.

13. A vehicle seat system according to claim 1 wherein said operating arm has a first portion extending generally vertically relative to said console, and a second portion extending generally horizontally relative to said console and above said head rest.

* * * * *